United States Patent [19]

Tanaka

[11] Patent Number: 4,704,615

[45] Date of Patent: Nov. 3, 1987

[54] THERMAL TRANSFER PRINTING APPARATUS

[75] Inventor: Hideshi Tanaka, Yokohama, Japan

[73] Assignee: Victor Company of Japan, Ltd., Japan

[21] Appl. No.: 883,975

[22] Filed: Jul. 10, 1986

[30] Foreign Application Priority Data

Jul. 15, 1985 [JP] Japan ................................ 60-155471

[51] Int. Cl.[4] .......................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS 4,399,749 8/1983 Arai ................................ 101/211 X
4,442,342 4/1984 Yoneda ........................... 219/216 X
4,527,171 7/1985 Tananashi et al. ............. 346/76 PH

FOREIGN PATENT DOCUMENTS 58-219087 6/1982 Japan ................................ 400/120

*Primary Examiner*—E. A. Goldberg
*Assistant Examiner*—Gerald E. Preston
*Attorney, Agent, or Firm*—Andrus, Sceales, Starke & Sawall

[57] ABSTRACT

A thermal transfer type printing apparatus first transfers white or transparent ink on a recording paper and thereafter transfers ink of a predetermined color on top of the recording made by the white or transparent ink, so that the recording is always made by the ink of the predetermined color on a smooth surface even when the surface of the recording paper is not smooth.

10 Claims, 7 Drawing Figures

THERMAL TRANSFER PRINTING APPARATUS

BACKGROUND OF THE INVENTION

The present invention generally relates to thermal transfer type printing apparatuses, and more particularly to a thermal transfer type printing apparatus which transfers white or transparent ink on a recording paper and transfers ink of a predetermined color on top of the recording made by the white or transparent ink.

Printing apparatuses may be roughly divided into impact type printing apparatuses and non-impact type printing apparatuses. An impact type printing apparatus generally comprises a head having a plurality of wire-dots, and an image is printed on a recording paper when the wire-dots strike an ink ribbon on an ink sheet placed on top of the recording paper. However, in the impact type printing apparatus, a large mechanical noise is generated during the printing operation due to the striking action of the wire-dots. Further, there is a disadvantage in that the resolution of the printed image is poor.

On the other hand, the non-impact type printing apparatuses may be roughly divided into ink-jet type printing apparatuses and thermal transfer type printing apparatuses. An ink-jet type printing apparatus generally comprises a head having a plurality of nozzles, and the image is printed on the recording paper when ink is sprayed onto the recording paper from the nozzles. Compared to the impact type printing apparatus, the ink-jet type printing apparatus is advantageous in that only a small mechanical noise is generated during the printing operation. However, there is a disadvantage in that the nozzles are easily blocked by refuse or ink or the like which adheres to the nozzles.

A thermal transfer type printing apparatus comprises a thermal printing head. The image is printed on the recording paper when the thermal printing head heats an ink ribbon or an ink film placed on top of the recording paper. Compared to the impact type printing apparatus, the thermal transfer type printing apparatus is advantageous in that only a small mechanical noise is generated during the printing operation. Moreover, the problems of the refuse of ink adhering to the nozzles and the blocking the nozzles in the case of the ink-jet type printing apparatus will not occur in the thermal transfer type printing apparatus. However, since the thermal transfer type printing apparatus prints the image by melting ink or the ink ribbon or film and transferring the melted ink on the recording paper, a problem occurs when the surface of the recording paper is not smooth. In other words, when the surface of the recording paper is rough and includes concave portions and convex portions, the melted ink is only transferred on the convex portions of the surface of the recording paper and the melted ink will not reach the concave portions of the surface of the recording paper. As a result, it is impossible to obtain a clear printed image when the surface of the recording paper is not smooth.

SUMMARY OF THE INVENTION

Accordingly, it is a general object of the present invention to provide a novel and useful thermal transfer type printing apparatus in which the problems described heretofore are eliminated.

Another and more specific object of the present invention is to provide a thermal transfer type printing apparatus which transfers white or transparent ink on a recording paper and transfers ink of a predetermined color on top of the recording made by the white or transparent ink. According to the thermal transfer type printing apparatus of the present invention, it is possible to obtain a clear printed image even when the surface of the recording paper is not smooth because the white or transparent ink is tranferred on the recording paper and the ink of the predetermined color is transferred on the smooth surface of the recording made by the white or transparent ink.

Still another object of the present invention is to provide a thermal transfer type printing apparatus which transfers the white or transparent ink on the recording paper in a printing area which is greater than a printing area in which the ink of the predetermined color is thereafter transferred. According to the thermal transfer type printing apparatus of the present invention, it is possble to ensure complete transfer of the ink of the predetermined color on the recording paper because the printing area of the white or transparent ink is greater than that of the ink of the predetermined color.

Other objects and further features of the present invention will be apparent from the following detailed description when read in conjunction with the accompanying drawings.

DETAILED DESCRIPTION

Figure 1:
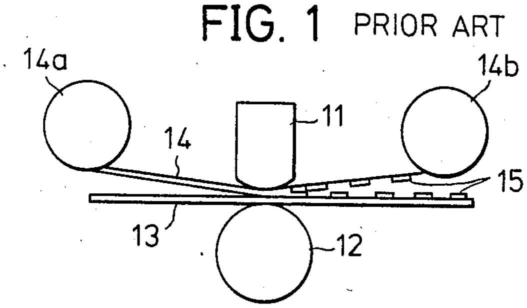
FIG. 1 PRIOR ART
FIG. 1 generally shows an example of the conventional thermal transfer type printing apparatus.

FIG. 1 generally shows an example of the conventional thermal transfer type printing apparatus. In FIG. 1, a recording paper 13 and an ink transfer sheet 14 are fed between a thermal printing head 11 and a platen roller 12. The ink transfer sheet 14 is paid out of a supply roll 14*a* and is taken up on a take-up roll 14*b*. The thermal printing head 11 comprises a plurality of heating resistors (not shown). When a current is applied to predetermined one of the heating resistors of the thermal printing head 11, ink 15 coated on the ink transfer sheet 14 is heated at portions corresponding to the heating resistors which are applied with the current, and melted ink is transferred on the recording paper 13.

Figure 2:
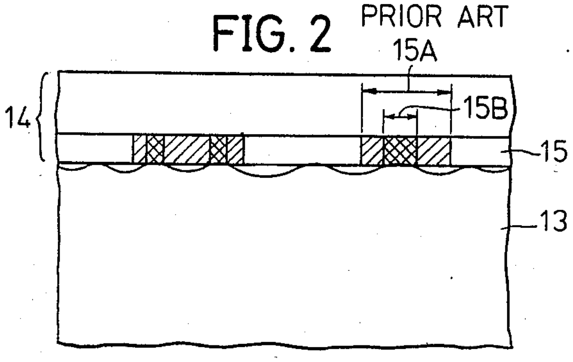
FIG. 2 PRIOR ART
FIG. 2 is a cross sectional view showing recordings made on a recording paper by the conventional thermal transfer type printing apparatus shown in FIG. 1.
Figure 4:
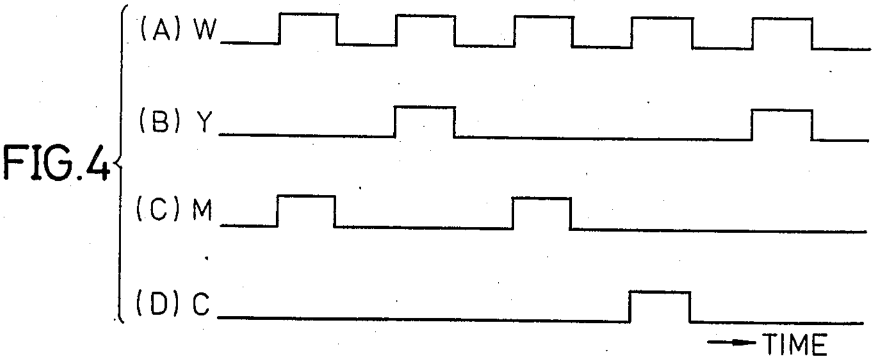
FIGS. 4(A) through 4(D) show signal waveforms of signals supplied to a date selector of the thermal transfer type printing apparatus shown in FIG. 3.

However, as shown in FIG. 2, when the surface of the recording paper 13 is not smooth and comprises concave portions and convex portions, a melted portion 15A (indicated by hatchings) of the ink 15 coated on the ink transfer sheet 14 and corresponding to the heating resistor applied with the current is not transferred in its entirety on the recording paper 13. As a result, only a melted portion 15B (indicated by cross hatchings) of the ink 15 corresponding to the convex portion of the recording paper 13 is transferred on the recording paper 13, and the remaining portion of the melted portion 15A is not transferred on the concave portion of the recording paper 13. For this reason, the conventional thermal transfer type printing apparatus suffers a disadvantage in that it is impossible to obtain a clear printed image when the surface of the recording paper 13 is not smooth.

The present invention overcomes the disadvantage of the conventional thermal transfer type printing apparatus by transferring white or transparent ink on the recording sheet and transferring ink of a predetermined color on top of the recording made by the white or transparent ink, so that it is possible to obtain a clear printed image even when the surface of the recording paper is not smooth.

Figure 3:
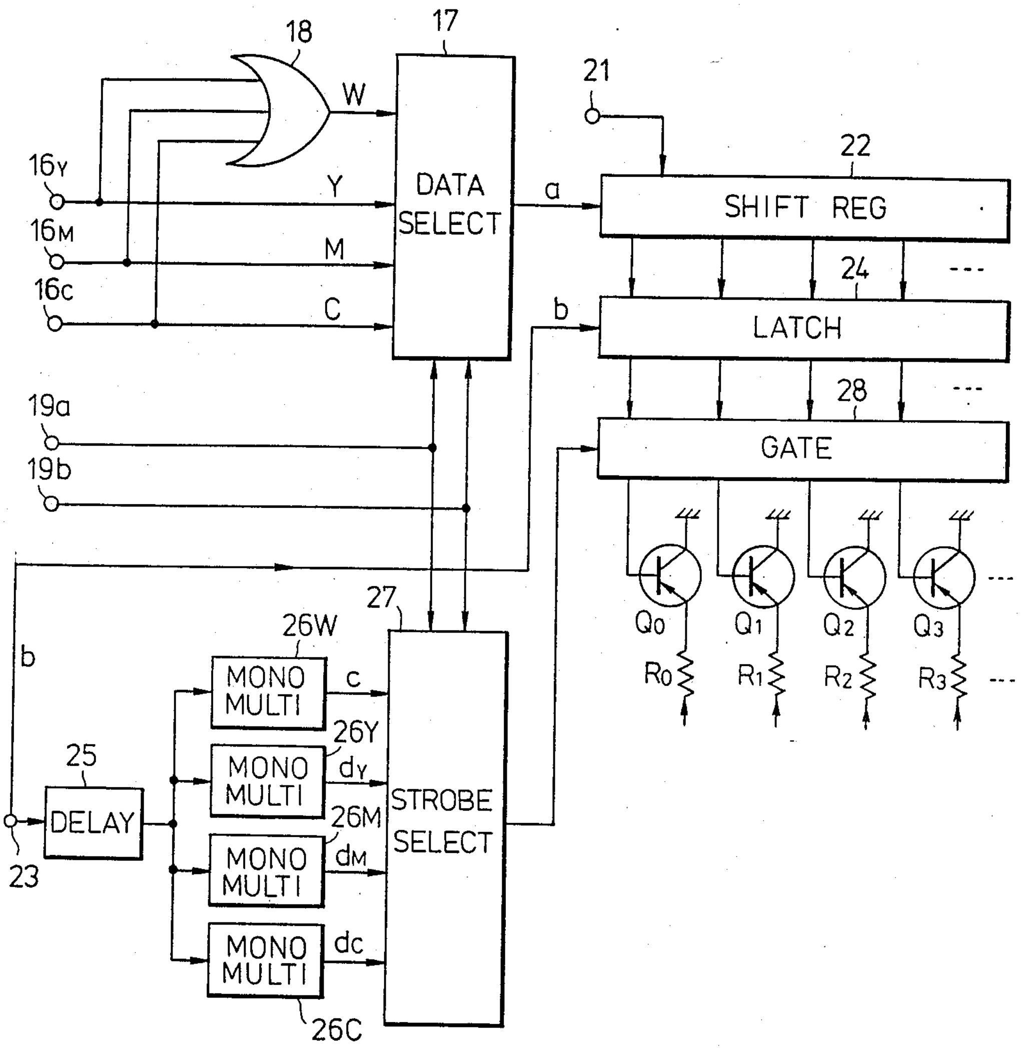
FIG. 3 is a system block diagram showing an embodiment of the thermal transfer type printing apparatus according to the present invention.

FIG. 3 shows an embodiment of the thermal transfer type printing apparatus according to the present invention. In FIG. 3, yellow, magenta and cyan color signals Y, M and C are applied to input terminals 16Y, 16M and 16C in accordance with the information related to an image which is to be permitted on a recording paper. The color signals Y, M and C are supplied directly to a data selector 17 on one hand. On the other hand, the color signals Y. M and C are converted into a white or transparent signal W in an OR circuit 18, and this white or transparent signal W is supplied to the data selector 17. The signals W, Y, M and C have waveforms respectively shown in FIGS. 4(A) through 4(D), for example. Control signals are applied to input terminals 19*a* and 19*b* and are supplied to the data selector 17. Hence, the data selector 17 produces a data signal a shown in FIG. 6(A) by selectively producing the signals supplied thereto in the sequence of the signals W, Y, M and C responsive to the control signals from the input terminals 19*a* and 19*b*.

Figure 5:
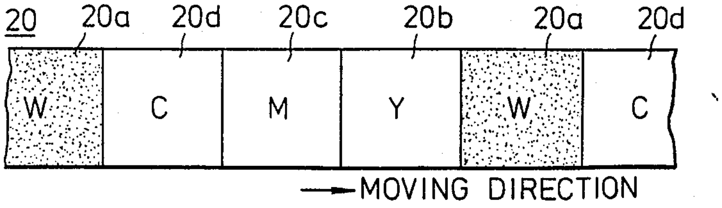
FIG. 5 shows an embodiment of an ink transfer sheet used in the thermal transfer type printing apparatus according to the present invention.

In the present embodiment, the thermal transfer type printing apparatus has an arrangement similar to that shown in FIG. 1 but uses an ink transfer sheet 20 shown in FIG. 5. The ink transfer sheet 20 comprises an ink portion 20*a* coated with white or transparent ink, an ink portion 20*b* coated with yellow ink, an ink portion 20*c* coated with magenta ink and an ink portion 20*d* coated with cyan ink with a constant pitch. An ink portion group comprises the ink portions 20*a*, 20*b*, 20*c* and 20*d* in this sequence along the moving direction of the ink transfer sheet 20, and such ink portion groups are repeatedly formed on the ink transfer sheet 20. Hence, every time the ink transfer sheet 20 is moved by one pitch by a known moving mechanism (not shown), it is possible to selectively transfer the ink of one of the ink portions 20*a* through 20*d* on the recording paper.

Figure 6:
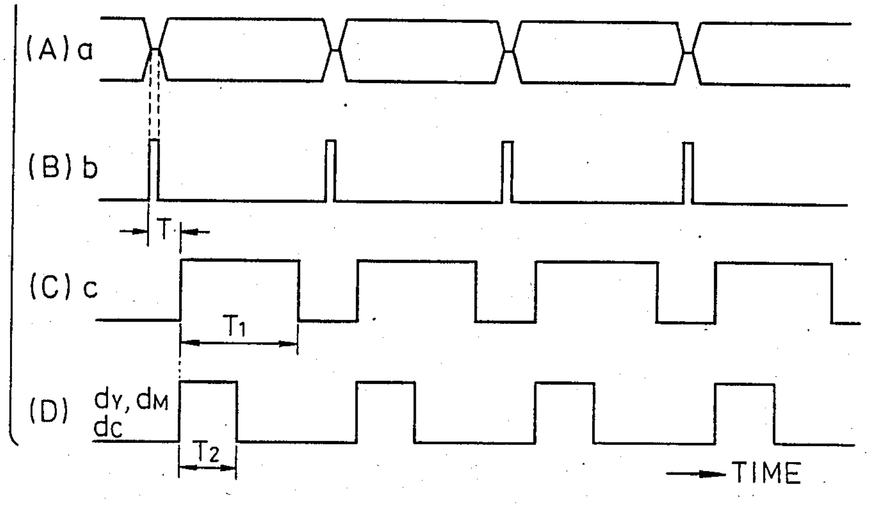
FIGS. 6(A) through 6(D) show signal waveforms for explaining the operation of the thermal transfer type printing apparatus shown in FIG. 3.

The output data signal a of the data selector 17 is supplied to a shift register 22 which successively enters and shifts data of the data signal a responsive to a clock signal applied to an input terminal 21. When the data signal a amounting to one printing line of the image which is to be printed is supplied to the shift register 22, a load and latch pulse signal b shown in FIG. 6(B) is applied to an input terminal 23 and is supplied to a latch circuit 24 so as to latch an output of the shift register 22. On the other hand, the load and latch pulse signal b is delayed by a predetermined delay time T in a delay circuit 25 and is supplied to monostable multivibrators 26W, 26Y, 26M and 26C. As a result, a strobe pulse signal c shown in FIG. 6(C) for the printing with the white or transparent ink and having a pulse width T1 is obtained from the monostable multivibrator 26W. A strobe pulse signal $d_Y$ shown in FIG. 6(D) for the printing with the yellow ink and having a pulse width T2 is obtained from the monostable multivibrator 16Y. A strobe pulse signal $d_M$ for the printing with the magenta ink and a strobe pulse signal $d_C$ for the printing with the cyan ink are respectively obtained from the monostable multivibrators 26M and 26C. The strobe pulse signals $d_M$ and $d_C$ obtained from the monostable multivibrators 26M and 26C are identical to the strobe pulse signal $d_Y$ obtained from the monostable multivibrator 26Y. The output strobe pulse signals c, $d_Y$, $d_M$ and $d_C$ of the monostable multivibrators 26W, 26Y, 26M and 26C are supplied to a strobe selector 27. The strobe selector 27 is also supplied with the control signals from the input terminals 19a and 19b, and selectively produces the strobe pulse signals in the sequence of the strobe pulse signals c, $d_Y$, $d_M$ and $d_C$ responsive to the control signals.

Each of the strobe pulse signals c, $d_Y$, $d_M$ and $d_C$ from the strobe selector 27 are supplied to a gate circuit 28 and gate corresponding output data of the latch circuit 24 depending on the respective pulse widths T1 and T2 of the strobe pulse signals c, $d_Y$, $d_M$ and $d_C$. Hence, selected ones of transistors Q0, Q1, Q2, . . . turned ON depending on the output data of the latch circuit 24. Heating resistors R0, R1, R2, . . . are coupled to the respective transistors Q0, Q1, Q2, . . . , and thus, a current is applied to those heating resistors out of the heating resistors R0, R1, R2, . . . which are coupled to the transistors which are turned ON. The heating resistors which are applied with the current is heated and melt the ink of the ink transfer sheet 20, and the melted ink is transferred on the recording paper so as to carry out a printing operation.

The printing operation is carried out as follows. First, the printing is carried out on the recording paper by use of the ink portion 20*a* of the ink transfer sheet 20. Then, the thermal printing head is separated from the ink transfer sheet 20 and only the ink transfer sheet 20 is moved by one pitch so that the printing can be carried out by use of the ink portion 20*b* of the ink transfer sheet 20 on top of the recording made by the ink portion 20*a*. Next, the ink transfer sheet 20 is again moved by one pitch so that the printing can be carried out by use of the ink portion 20*c* of the ink transfer sheet 20 on top of the recordings made by the ink portions 20*a* and 20*b*. Thereafter, the ink transfer sheet 20 is moved by one pitch so that the printing can be carried out by use of the ink portion 20*d* of the ink transfer sheet 20 on top of the recordings made by the ink portions 20*a*, 20*b* and 20*c*. When such a sequence of operations are completed for one printing line, the recording paper and the ink transfer sheet 20 are both moved by approximately one pitch so that the printing can be carried out by the use of the next ink portion 20*a*. Such operations are repeated to print a color image.

In the present embodiment, the printing operation is carried out by use of the ink portions of the ink transfer sheet 20 in the sequence of the ink portions 20*a*, 20*b*, 20*c* and 20*d*. That is, the printing operation is carried out by use of the ink portions 20*a* through 20*d* in the sequnce of the ink portions having the white or transparent ink, yellow ink, magenta ink and cyan ink. However, the printing sequence of the colors is not limited to that of the embodiment. As long as the printing operation is first carried out by use of the white or transparent ink, the rest of the printing operation can be carried out by use of the yellow, magenta and cyan ink in any arbitrary sequence. In the case where the printing operation is carried out by use of the yellow, magenta and cyan ink in a sequence different from that of the embodiment, the sequences of the ink portions 20*a* through 20*d* of the ink transfer sheet 20 must be changed accordingly.

Furthermore, an ink ribbon may be used instead of the ink transfer sheet 20. In this case, the ink ribbon comprises portions coated with the white or transparent ink, yellow ink, magenta ink and cyan ink similarly as in the case of the ink transfer sheet 20.

Figure 7:
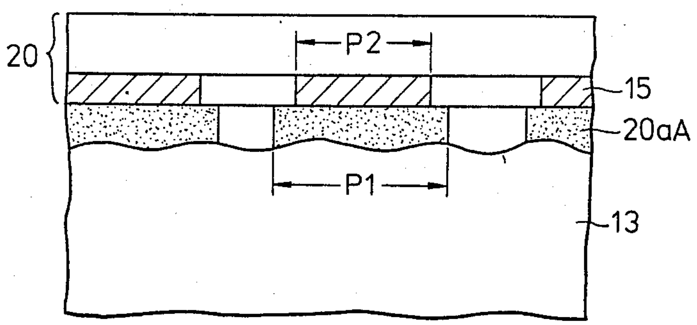
FIG. 7 is a cross sectional view showing recordings made on the recording paper by the thermal transfer type printing apparatus according to the present invention.

FIG. 7 shows the recordings made on the recording paper by the thermal transfer type printing apparatus according to the present invention. In FIG. 7, those parts which are the same as those corresponding parts in FIG. 2 are designated by the same reference numerals. When carrying out the printing operation by use of the ink portion 20*a* of the ink transfer sheet 20, the heating resistors which are to be heated are applied with the current for a relatively long time as may be seen from the pulse width T1 of the strobe pulse signal c shown in FIG. 6(C). Thus, the white or transparent film on the ink portion 20*a* is uniformly transferred on the recording paper 13 on a large area P1 including the concave and convex portions on the surface of the recording paper 13. On the other hand, when hereafter carrying out the printing operation by use of one of the ink portions 20*b*, 20*c* and 20*d*, the heating resistors which are to be heated are applied with the current for a relatively short time as may be seen from the pulse width T2 of the strobe pulse signals $d_Y$, $d_M$ and $d_C$. For this reason, the yellow, magenta or cyan ink is transferred on an area P2 which is on top of the area P1 and is smaller than the large area P1. Since the area P2 is formed on top of the large area P1 which is formed uniformly on the surface of the recording paper 13, it is possible to positively transfer the color ink on the recording paper 13 (that is, on top of the large area P1) regardless of whether or not the surface of the recording paper 13 is rough. Therefore, it is possible to constantly print a clear image on the recording paper 13.

In the present embodiment, the areas P1 and P2 are made different by setting the pulse widths of the strobe pulse signals c, $d_Y$, $d_M$ and $d_C$ different. However, other methods may be employed to make the heating times of the heating resistors different for the printing operation using the white or transparent ink and the printing operation using the color ink. For example, the magnitude of the current or voltage applied to the heating resistors can be set differently for the printing operation using the white or transparent ink and the printing operation using the color ink.

In the embodiment, the ink transfer sheet comprises ink portions coated with ink of white or transparent, yellow, magenta and cyan colors. However, the ink portions coated with the color ink may be coated with ink of three colors other than yellow, magenta and cyan.

In addition, the thermal transfer type printing apparatus according to the present invention is not limited to the color printing of the described embodiment, and may be applied to the printing with only one predetermined color (for example, black).

Further, the present invention is not limited to these embodiments, but various variations and modifications may be made without departing from the scope of the present invention.

What is claimed is:

1. A thermal transfer type printing apparatus comprising:

a thermal printing head;

a recording paper;

an ink transfer sheet comprising first and second ink portions and placed between said thermal printing head and said recording paper, said first ink portion being coated with white or transparent ink, said second ink portion being coated with ink of a predetermined color;

input terminal means applied with input data related to an image which is to be printed on said recording paper; and control means for controlling heating times of said thermal printing head responsive to said input data so as to heat and melt the ink of said ink transfer sheet on said recording paper depending on said input data, said thermal printing head under control of said control means making recordings by first transferring the white or transparent ink of said first ink portion on said recording paper depending on said input data and thereafter transferring the ink of the predetermined color of said second ink portion on top of the recordings made by the white or transparent ink of said first ink portion depending on said input data, said control means controlling the heating times of said thermal printing head so that an area of each recording made on said recording paper with the white or transparent ink of said first ink portion is greater than an area of a corresponding recording made with the ink of the predetermined color of said second ink portion.

2. A thermal transfer type printing apparatus as claimed in claim 1 in which said control means supplies pulse signals having mutually different pulse widths so as to control the heating times of said thermal printing head.

3. A thermal transfer type printing apparatus as claimed in claim 1 in which said second ink portion of said ink transfer sheet includes first, second and third portions respectively coated with ink of three colors.

4. A thermal transfer type printing apparatus as claimed in claim 3 in which said first, second and third portions are respectively coated with yellow, magenta and cyan ink.

5. A thermal transfer type printing apparatus as claimed in claim 3 in which said first ink portion and said first, second and third portions of said second ink portion are arranged on said ink transfer sheet in a sequence in correspondence with a sequence with which the recordings are made on said recording paper by the white or transparent ink and the ink of three colors.

6. A thermal transfer type printing apparatus comprising:

a thermal printing head comprising a plurality of heating resistors;

a recording paper;

an ink transfer sheet comprising first, second, third and

7. A thermal transfer type printing apparatus as claimed in claim 6 in which said second through fourth strobe pulse signals have mutually identical pulse widths.

8. A thermal transfer type printing apparatus as claimed in claim 6 in which said strobe pulse generating means comprises delay means for delaying said load and latch pulse signal, and monostable multivibrator means supplied with an output of said delay means for generating said first through fourth strobe pulse signals.

9. A thermal transfer type printing apparatus as claimed in claim 6 in which said three color signals comprise a yellow signal, a magenta signal and a cyan signal.

10. A thermal transfer type printing apparatus as claimed in claim 6 in which said first through fourth ink portions are arranged on said ink transfer sheet in a sequence in correspondence with a sequence with which the recordings are made on said recording paper by the white or transparent ink and the ink of three colors.

* * * * *

UNITED STATES PATENT AND TRADEMARK OFFICE
CERTIFICATE OF CORRECTION

PATENT NO. : 4,704,615

DATED : November 3, 1987

INVENTOR(S) : HIDESHI TANAKA

It is certified that error appears in the above-identified patent and that said Letters Patent is hereby corrected as shown below:

Column 6, Line 64, After "and" insert the following--- fourth ink portions and placed between said thermal printing head and said recording paper, said first ink portion being coated with white or transparent ink, said second through fourth ink portions being respectively coated with ink of three colors;

first input terminal means applied with three color signals related to an image which is to be printed on said recording paper;

second input terminal means applied with control signals;

third input terminal means applied with a load and latch pulse signal when the three color signals amounting to one printing line are applied to said first input terminal means;

fourth input terminals means applied with a clock signal;

converting means for converting said three color signals into a white or transparent signal;

data selector means responsive to said control signals for producing a data signal by selectively passing said white or transparent signal and said

CERTIFICATE OF CORRECTION

PATENT NO. : 4,704,615 Page 2 of 4
DATED : November 3, 1987
INVENTOR(S) : HIDESHI TANAKA It is certified that error appears in the above-identified patent and that said Letters Patent is hereby corrected as shown below:

three color signals in a predetermined sequence;
shift register means supplied with said data signal for successively shifting data of said data signal responsive to said clock signal;
latch means for latching output data of said shift register means responsive to said load and latch pulse signal;
strobe pulse generating means for generating first through fourth strobe pulse signals from said load and latch pulse signal, each of said first through fourth strobe pulse signals having pulse widths corresponding to heating times of said heating resistors of said thermal printing head for recordings with the white or transparent ink and the ink of three colors;
strobe selector means responsive to said control signals for producing a strobe signal by selectively passing said first through fourth strobe pulse signals in a predetermined sequence;
gate means for gating an output of said latch means responsive to said strobe signal; and

UNITED STATES PATENT AND TRADEMARK OFFICE
CERTIFICATE OF CORRECTION

PATENT NO. : 4,704,615

DATED : November 3, 1987

INVENTOR(S) : HIDESHI TANAKA

It is certified that error appears in the above-identified patent and that said Letters Patent is hereby corrected as shown below:

switching means for applying a current to said heating resistors of said thermal printing head depending on an output of said gate means so as to melt the ink of said ink transfer sheet and transfer the melted ink on said recording paper in accordance with said three color signals, said heating resistors of said thermal printing head making recordings by first transferring the white or transparent ink of said first ink portion on said recording paper depending on said white or transparent signal of said data signal and thereafter transferring the ink of the three colors of said second through fourth ink portions on top of the recordings made by the white or transparent ink of said first ink portion in a predetermined sequence depending on said three color signals of said data signal, said first strobe pulse signal having a pulse width greater than those of said second through fourth strobe pulse signals, said first strobe pulse

UNITED STATES PATENT AND TRADEMARK OFFICE

CERTIFICATE OF CORRECTION

PATENT NO. : 4,704,615

DATED : November 3, 1987

INVENTOR(S) : HIDESHI TANAKA

It is certified that error appears in the above-identified patent and that said Letters Patent is hereby corrected as shown below:

signal controlling the heating time of said heating resistors of said thermal printing head during the recording made by the white or transparent ink of said first ink portion.---

Signed and Sealed this

Twelfth Day of July, 1988

*Attest:*

DONALD J. QUIGG

*Attesting Officer*

*Commissioner of Patents and Trademarks*